(No Model.) 2 Sheets—Sheet 1.

J. H. WILLIAMS.
VALVE FOR ENGINES.

No. 401,400. Patented Apr. 16, 1889.

Witnesses:
John C. Moses.
Thos. F. Moses

Inventor:
John H. Williams.

N. PETERS, Photo-Lithographer, Washington, D. C.

(No Model.) 2 Sheets—Sheet 2.

J. H. WILLIAMS.
VALVE FOR ENGINES.

No. 401,400. Patented Apr. 16, 1889.

WITNESSES:
Wm. G. Windhurst
G. M. Gridley

INVENTOR
John H. Williams,
By H. A. Toulmin
his Attorney.

UNITED STATES PATENT OFFICE.

JOHN H. WILLIAMS, OF URBANA, OHIO.

VALVE FOR ENGINES.

SPECIFICATION forming part of Letters Patent No. 401,400, dated April 16, 1889.

Application filed January 9, 1888. Serial No. 260,236. (No model.)

*To all whom it may concern:*

Be it known that I, JOHN H. WILLIAMS, a citizen of the United States, residing at Urbana, in the county of Champaign, State of Ohio, have invented new and useful Improvements in Steam-Valves for Engines, of which the following is a specification, reference being had therein to the accompanying drawings.

My invention is constructed upon an entirely new plan; and the object of my invention is to provide a valve for steam-engines that will be an improvement over those commonly used. It is very simple in construction, is easy to adjust and regulate, and its construction is such that the steam-pressure adds very little to the friction, as it is all exerted on the journals of the valve-pinion, which is easily kept continuously oiled. I secure these results by the mechanism illustrated in the accompanying drawings, in which—

Figure 2:
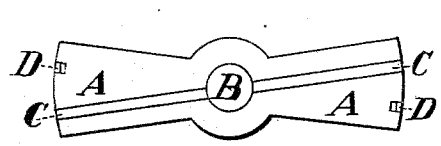
Figure 4:
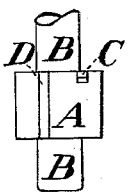
Figure 3:
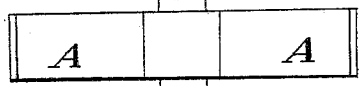
Figure 1:
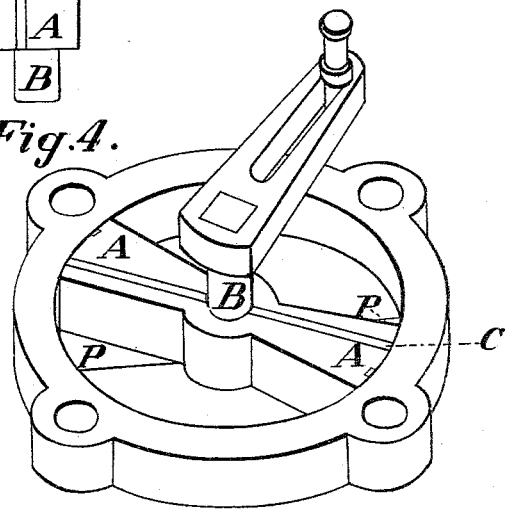
Figure 5:
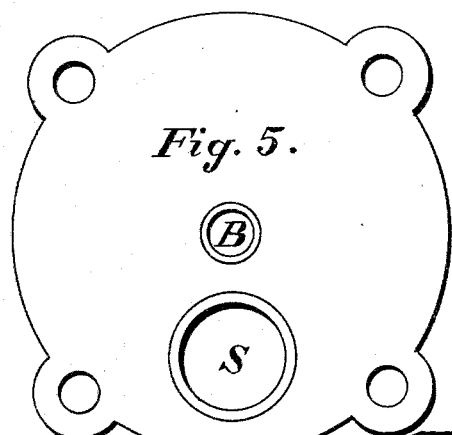
Figure 6:
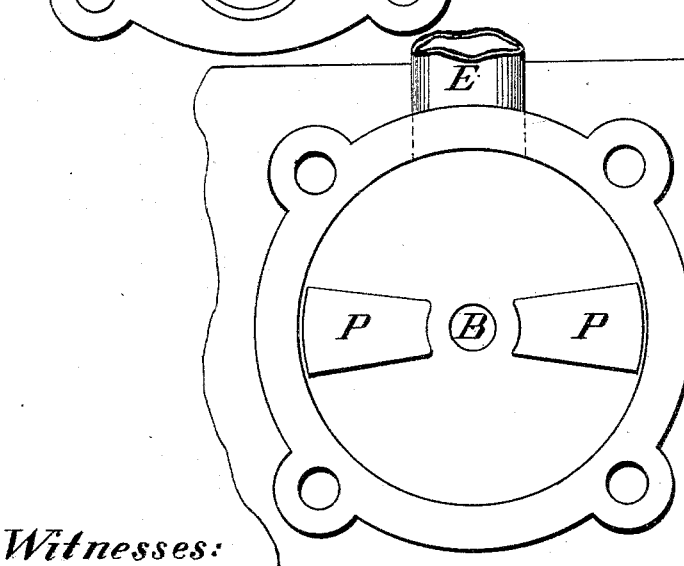
Figure 7:
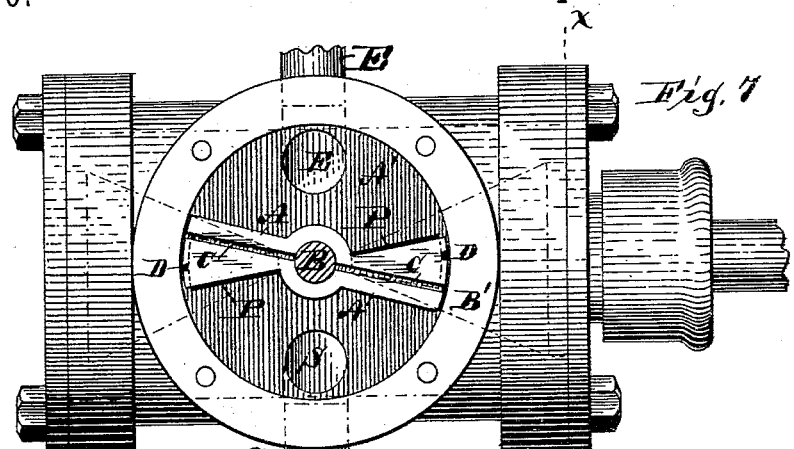
Figure 8:
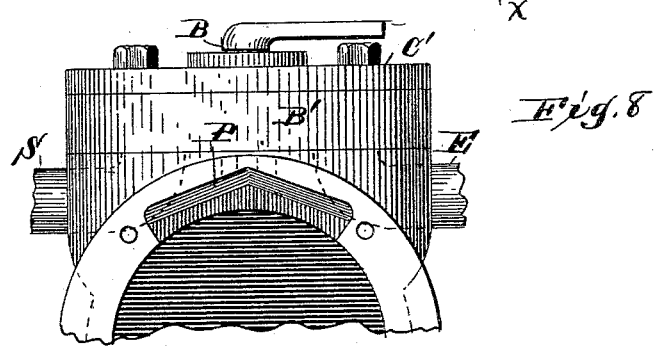

Figure 1 is a perspective view or projection of the steam-chest without the cap; Fig. 2, a top view of the valve or oscillator; Fig. 3, a side view or elevation of the valve, and Fig. 4 an end view of the same. Fig. 5 is a top view of the steam-chest cap, showing the opening S for the steam-pipe. Fig. 6 is a top view of the valve-seat with the rim of the steam-chest on, and showing the position of the exhaust-pipe E and part of the cylinder; Fig. 7, a plan view of the cylinder with my improvements; Fig. 8, an elevation on the line $x\,x$ of Fig. 7, and Fig. 9 a longitudinal sectional view of the cylinder with my improvements.

Similar letters refer to the same parts throughout the several views.

The valve A A is exactly equal in length to the diameter of the steam-chest, and is exactly as thick as the distance from the cap of the steam-chest to the valve-seat. It oscillates on the pinion B B, and opens in turn each port on the steam side, and at the same time opens the other on the exhaust side. The valve is packed as follows: C C are bars laid in grooves of the same width, and held against the cap by means of springs under them. D D are similar bars in the ends of the valve, held against the side of the steam-chest by springs back of them. The valve may be made to fit steam-tight, and when new will hardly need packing in small engines, but the packing serves to take up wear.

The valve is operated by means of the crank, which is connected by the pin to the eccentric-rod. The eccentric and eccentric-rod as now used are especially adapted to operate this valve, and the Stephenson link-motion for reversing the valve as used on locomotive-engines is equally well adapted to operate this valve as the slide-valve. The valve-seat is composed of a flat surface, A', which is the face of the boss or usual enlargement cast on the sides of the steam-cylinders.

The valve-casing consists of an annular frame or body, B', bolted or otherwise secured upon the face A', and provided with a cap, C', also secured by bolts or otherwise. There are two ways in which I contemplate introducing the live steam into and exhausting the dead steam from the valve-chest, and these ways are illustrated in Figs. 5, 6, 7, and 8 of the drawings. In the first two figures the manner illustrated consists in providing the cap B' with an opening near one side thereof, with which is connected the steam-inlet pipe S, and in providing the ring B' with a lateral opening, with which is connected the exhaust-pipe E. In the latter two figures the inlet and exhaust openings which lead to the interior of the valve-chest are formed in the boss already alluded to, and the pipes S and E connected with said openings; and this is the preferred form, because it admits of the removal of the cap C' and ring B' without disconnecting the steam-pipes, in case of a desire to get access to the interior of the valve-chest, as is frequently the case, to supply new packing, for instance.

Referring now to Figs. 6 and 7, it will be seen that the mouths of the engine-ports, at the ends which open into the steam-chest are substantially the shape and are but slightly smaller than the arms of the valve, which, in conjunction with the remaining portion of these ports, presently to be described, affords material advantages in the practical operation of the engine.

Figure 9:
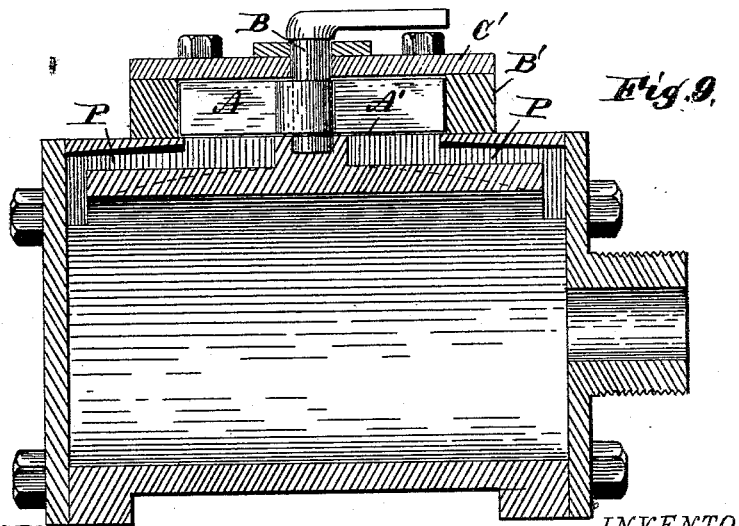

The shape of the remaining portion of the ports is shown in Figs. 7, 8, and 9, and consists in gradually widening the ports from the inner ends of the mouths within the steam-chest until the width of the outer ends of the ports occupy a considerable portion of the circumference of the cylinder. The result of this form is that the smallest area of the port between the outer end of the mouth and the outer end of the port is equal to the area of the port, whereby, when the whole length of the mouth is opened by a movement of the valve, the inlet and outlet of the steam are perfectly free and exceptionally quick and direct; or, in other words, the valve opens the mouths of the port throughout the entire length of the mouths, and the ports proper, by reason of the characteristics above mentioned, coact with the mouths in the rapid admission and emission of the steam.

In Fig. 8 it will be seen from the dotted lines that the steam-ports may be made straight in cross-section, this form being best in small engines.

I am aware that prior to my invention oscillating valves have been in use, and I therefore do not claim, broadly, the invention of oscillating valves; but What I do claim, and wish to secure by Letters Patent, is—

1. The combination, with an oscillating valve and its steam-chest, composed in part of an annular body and a cap-plate, of a steam-cylinder having a boss fashioned to form the remainder of said chest and provided with port-mouths, at diametrical points, of substantially the shape and slightly smaller than the arms of said valve, and constructed with ports proper whose area is not less than that of said mouths.

2. The combination, with the steam-chest, composed of an annular body, a cap-plate, and the cylinder-boss, of two steam-pipes which connect with the boss at diametrical points of the chest and communicate with the chest through openings in the boss, an oscillating valve whose shaft is mounted in said boss, and said plate and cylinder-ports within said chest.

JOHN H. WILLIAMS.

Witnesses:
THOS. F. MOSES,
W. F. RING.